United States Patent [19]
Loram

[11] Patent Number: 5,812,820
[45] Date of Patent: Sep. 22, 1998

[54] VIRTUAL UART

[75] Inventor: John S. H. Loram, Ashland, Oreg.

[73] Assignee: Pacific CommWare, Inc., Ashland, Oreg.

[21] Appl. No.: 536,424

[22] Filed: Sep. 29, 1995

[51] Int. Cl.$^6$ ................................................. G06F 9/455
[52] U.S. Cl. .......................................................... 395/500
[58] Field of Search .................................. 395/500, 364, 395/933.8; 364/578

[56] References Cited

U.S. PATENT DOCUMENTS

| | | | |
|---|---|---|---|
| 4,742,447 | 3/1988 | Puvall et al. ............................ | 395/406 |
| 4,926,322 | 5/1990 | Stimac ..................................... | 395/500 |
| 5,140,679 | 8/1992 | Michael .................................. | 395/289 |
| 5,199,105 | 3/1993 | Michael .................................. | 395/286 |
| 5,218,683 | 6/1993 | Jerrim et al. ............................ | 395/285 |
| 5,371,736 | 12/1994 | Evan ........................................ | 370/79 |
| 5,414,848 | 5/1995 | Sandage et al. ........................ | 395/677 |
| 5,459,869 | 10/1995 | Spilo ....................................... | 395/653 |
| 5,530,858 | 6/1996 | Stanley et al. .......................... | 395/650 |
| 5,541,853 | 7/1996 | Groft ................................... | 364/514 R |
| 5,603,014 | 2/1997 | Woodring et al. ...................... | 395/500 |

OTHER PUBLICATIONS

Ayre Rick, Turbo Com/2 i a must–have for Window–, Feb. 22, 1994 p. 44 PC Magazine.
Use Upmount to dump & Dble Space, Robinson, Earle, Jun. 1994 v2, n4, p. 233.
Charging Through the Windows Communication bottleneck, Kennedy, Randall C p. 422.
Turbo Com, Kennedy, Randal C., p. 430, Windows Sources.

*Primary Examiner*—Kevin J. Teska
*Assistant Examiner*—Dan Fiul
*Attorney, Agent, or Firm*—Graybeal Jackson Haley LLP

[57] ABSTRACT

The present invention is a computer operating system method for allowing applications running in Virtual Machines, including but not limited to DOS applications, making direct UART I/O accesses under Windows for Workgroups™ or Windows 95™ operating systems to access VCOMM port drivers installed in the system. The invention involves the steps of: (1) receiving from the application instructions for a UART; (2) simulating a UART by returning to the application simulations of the responses of a UART; (3) translating the instructions for a UART into instructions for VCOMM; (4) sending the translated instructions to VCOMM; receiving responses from VCOMM; (5) translating the responses from VCOMM intosimulated responses from a UART; and (6) transmitting the simulated responses from a UART to the application.

7 Claims, 2 Drawing Sheets

VIRTUAL UART

FIELD OF THE INVENTION

This invention relates to serial communications device drivers, and more particularly relates to communication device drivers for microprocessor based computers using the Windows for Workgroups™ or Windows 95™ operating system.

BACKGROUND OF THE INVENTION

There is an important limitation in the serial communications architecture that was introduced in Windows for Workgroups™ 3.11 and enhanced in Windows 95™. This new architecture incorporated two new software elements, <VCOMM 2> and the port driver 4. Together, they increased the device independence of the communication channel and simplified the introduction of serial communication devices that are not based on the traditional technology of the UART 6 (Universal Asynchronous Receiver/Transmitter) serial controller chip.

The benefit of this architecture, however, is limited to applications that use the Windows™ communications Application Program Interface (API). Such applications can access any VCOMM 2 port driver 4 that is installed in the system. As a result, Windows™ applications 8 can run on any communications device 9 or channel in the system that is supported by a VCOMM 2 port driver 4. Such a device can range from the familiar UART-based serial ports in internal modems to the new software modems and network modem pools. This freedom does not extend to applications running in Virtual Machines making direct UART I/O accesses, with DOS applications 10 being the most prevalent examples of such applications. Any reference to DOS applications 10 is also applicable to all applications running in Virtual Machines making direct UART I/O accesses.

DOS applications 10 assume the presence of a communications device that is based on the conventional UART 6, with its well-defined input and output registers. DOS applications 10 operate by making direct access to the UART's registers and interrupts. If a communications device does not conform to the UART 6 model, the DOS application cannot use it. As implemented by Microsoft™, the new versions of Windows™ do not allow DOS communication applications 10 to access port drivers. Thus, confined to second-class citizenship, mainline legacy applications such as ProComm for DOS, TAPCIS and Wildcat BBS, and numerous DOS games such as Doom, cannot run on the new high performance, nontraditional communication devices 9 that can be expected to gain a significant share of the market in the near future.

As shown in FIG. 1, through Version 3.1 of Windows™, Microsoft™ provided three serial port device drivers to handle UART-based serial ports. All three device drivers contain code that directly manipulated the serial communications hardware (UART 6). These drivers are VCD 12, COMM.DRV 14, and COMBuff 16. VCD 12 is a 32-bit virtual device driver (VxD) that uses the I/O trapping capabilities of the iapx processor on behalf of the application. Control of the UART 6 is passed to either COMBuff 16 (for DOS applications 10) or COMM.DRV 14 (for Windows™ applications 8). VCD 12 coordinates the activities of these other two drivers in order to provide contention-handling services. COMM.DRV 14 is a 16-bit protected mode UART 6 device driver that provides buffered, interrupt-driven services to Windows™ applications 8 with a 16-bit API. COMBuff 16 is a 32-bit VxD that provides similar services to DOS applications 10 by emulating the 16450 UART. COMBuff 16 uses the I/O trapping capabilities of the iapx processor to shield the physical hardware from direct manipulation by the DOS application 10. COMBuff 16 also provides low level receive buffering.

In Windows for Workgroups™ 3.11, Microsoft™ introduced a new serial communications architecture, refer to FIG. 2. This new framework handles serial communications by means of five modules, three of which contain code that directly manipulates the UART 6. These five modules are VCOMM 2, SERIAL. 386 18, COMM.DRV 14, COMBuff 16, VCD 12.

VCOMM 2 is a 32-bit VxD that selects the proper port driver 4 for 16-bit and 32-bit Windows™ applications 8 and provides the data and control path for the appropriate driver. VCOMM 2 and its clients (such as COMM.DRV 14) contain no code which directly manipulates hardware. Instead, VCOMM 2 is served by one or more port drivers, which manipulate the hardware on behalf of the application.

SERIAL.386 18 is a 32-bit VxD (the native serial port driver) that provides buffered interrupt-driven support for UART-based serial devices, initializing and manipulating these devices on behalf of 16-bit and 32-bit Windows™ applications 8. It does not provide these services to DOS applications 10. Third party vendors can create proprietary port drivers to support communication devices that are UART-based or non-UART-based. The Microsoft™ communication drivers make these port drivers, like SERIAL.386 18, accessible to Windows™ applications 8 only.

Under Windows for Workgroups™, COMM.DRV 14 is no longer a device driver and has much-reduced functionality. In this implementation, COMM.DRV 14 becomes a simple translation layer between the 16-bit Windows™ application and the VCOMM 2 32-bit API.

COMBuff 16 is a 32-bit VxD that mediates the access of DOS to UART-based serial devices. As in Windows™ 3.1, DOS applications 10 are not allowed direct access to the UART 6 hardware. Instead, COMBuff 16 manipulates the UART 6 on behalf of DOS applications 10, trapping, by way of VCD 12, all I/O activity and providing low level receive buffering and flow control support.

VCD 12 is a 32-bit virtual device driver (VxD) that uses the I/O trapping capabilities of the iapx processor on behalf of the application. Control of the UART 6 is passed to either COMBuff 16 (for DOS applications 10), or COMM. DRV 14 (for Windows™ applications 8). VCD 12 coordinates the activities of these other two drivers in order to provide contention-handling services.

In most respects, the serial port communication architecture for Windows 95™ is the same as it was for Windows for Workgroups™ 3.11. The same modules interact, performing the same basic functions. In Windows 95™ these modules have been enhanced, however, to add support for plug-and-play hardware, and for PCMCIA devices (to permit dynamic insertion and removal of communications channels). In Windows 95™, as in Windows for Workgroups™ 3.11, DOS applications 10 cannot interact with any of the system's port drivers 4. As a result, DOS applications 10 can only access traditional UART-based communication channels, using VCD 12 and COMBuff 16.

SUMMARY OF THE INVENTION

The present invention overcomes the limitations of the prior art by implementing two new modules, TurboVBUF 20 and TurboVCD 22. TurboVBUF 20 is a 32-bit virtual device driver (VxD) that acts as an intermediary between DOS applications 10 and VCOMM 2, SERIAL.386 18 and any other VCOMM 2 port drivers 4 that are present. TurboVCD 22 provides necessary supporting services such as contention management. TurboVBUF 20 gives DOS applications 10 access to all VCOMM 2 port drivers 4 on the system, and through the port drivers 4 access to the communication channels they support. This new VxD can be used to supplement COMBuff 16 or to replace it altogether. The additional Windows™ modules VCOMM 2, SERIAL.386 18, and COMM. DRV 14 are present in their native form, along with any third party port drivers 4 that have been installed.

When a DOS application 10 tries to read or write to any of the UART's eight registers, TurboVBUF 20 intercepts, by way of VCD's 12 I/O traps, the attempted physical I/O access and converts it into a form suitable for communication with the 32-bit API used by VCOMM 2. After receiving the application's I/O read/write activity, TurboVBUF 20 translates the data into the appropriate entries in the device control block if the application is trying to initialize the communications device or places the data in a RAM buffer for temporary storage if the application is attempting to write data to the device. TurboVBUF 20 then uses the VCOMM 2 client VxD service's interface to complete the transaction, using the appropriate VCOMM 2 function call and arguments.

The VCOMM 2 Application Program Interface (API) generalizes access to communications channels. This API includes calls to acquire and release a channel, send and receive data, and inquire about the capabilities and status of the communications channel and configure it for the application's needs. The effect of the TurboVBUF 20 intervention is to translate the DOS application's 10 attempt at direct manipulation of the UART 6 registers into a generic request that can be handled by any VCOMM 2 port driver 4. VCOMM 2 passes the function call and arguments to the appropriate port driver 4, which manipulates the target communications channel as directed. The specified task is carried out, without regard to whether the work is done on behalf of a DOS application 10, a 16-bit Windows™ application, or a 32-bit Windows™ application.

Windows™ has only provided contention-handling service for UARTs that are physically present in the system. The present invention solves this problem by creation of a virtual UART. A virtual UART exists as a software construct and is made addressable by the interaction between TurboVCD 22 and TurboVBUF. A virtual UART is assigned a logical name (such as COM3), a base address, and an IRQ setting just as if it were a physical UART 6. TurboVCD 22 provides contention handling for this port, just as if it included a real UART 6. The DOS application 10 is then configured to access the virtual port, as if it were a standard UART-based serial port. But when the DOS application 10 makes an I/O access to the virtual port, the attempt to read or write to the UART's register is trapped, converted to the VCOMM 2 API, and re-directed to the VCOMM 2 port driver 4 for the desired communications channel. In this way, the system is not forced to commit two communication devices to achieve one connection.

TurboVCD 22 disassociates the traditional initialization of the physical UART 6 and contention handling for UART-based devices. By breaking this link, TurboVCD 22 is able to provide support for virtual UARTs as well as for physical UARTs without tying up two communication devices. TurboVCD 22 also retains the functionality of the original VCD 12 which allows it to remain compatible with the native COMBuff 16 module as well as numerous third party COMBuff 16 modules.

TurboVCD 22 and Turbo VBuff modules provide complete emulation of the UART 6, including all eight of its registers (in native drivers only seven of the eight UART registers are virtualized), the FIFO buffers for the 16550 UART, and support for the diagnostic loop-back test mode. Since some applications use particular registers and UART 6 modes in unexpected ways, full emulation of the 16550 UART 6 makes the port drivers accessible to the complete range of DOS communications programs.

Turbo VBuff's virtualization of the UART includes a special feature which is a 16-BYTE transmit FIFO buffer with a timeout. This reduces the number of times that the _VCOMM_WriteComm function must be called, thereby cutting overhead and improving processor performance.

DETAILED DESCRIPTION OF THE PREFERRED EMBODIMENT

Figure 1:
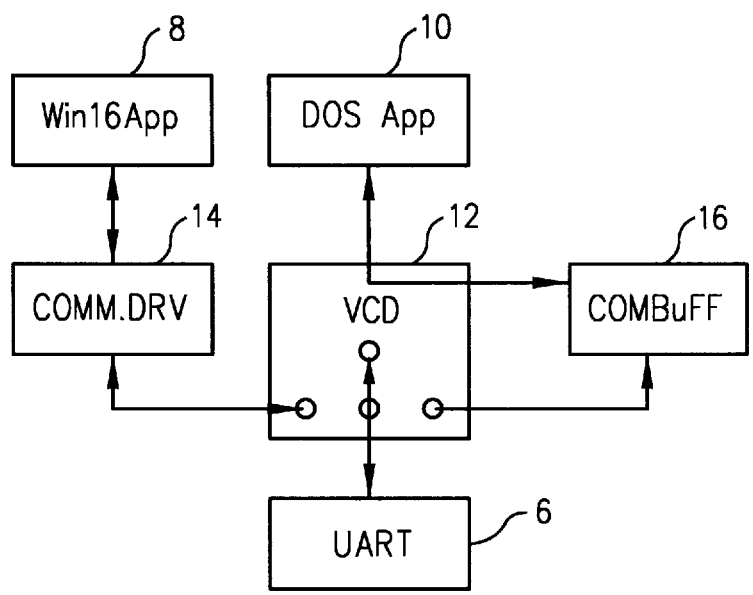
FIG. 1 is a depiction of the serial communication architecture under Windows™ 3.1 and 3.0.
Figure 2:
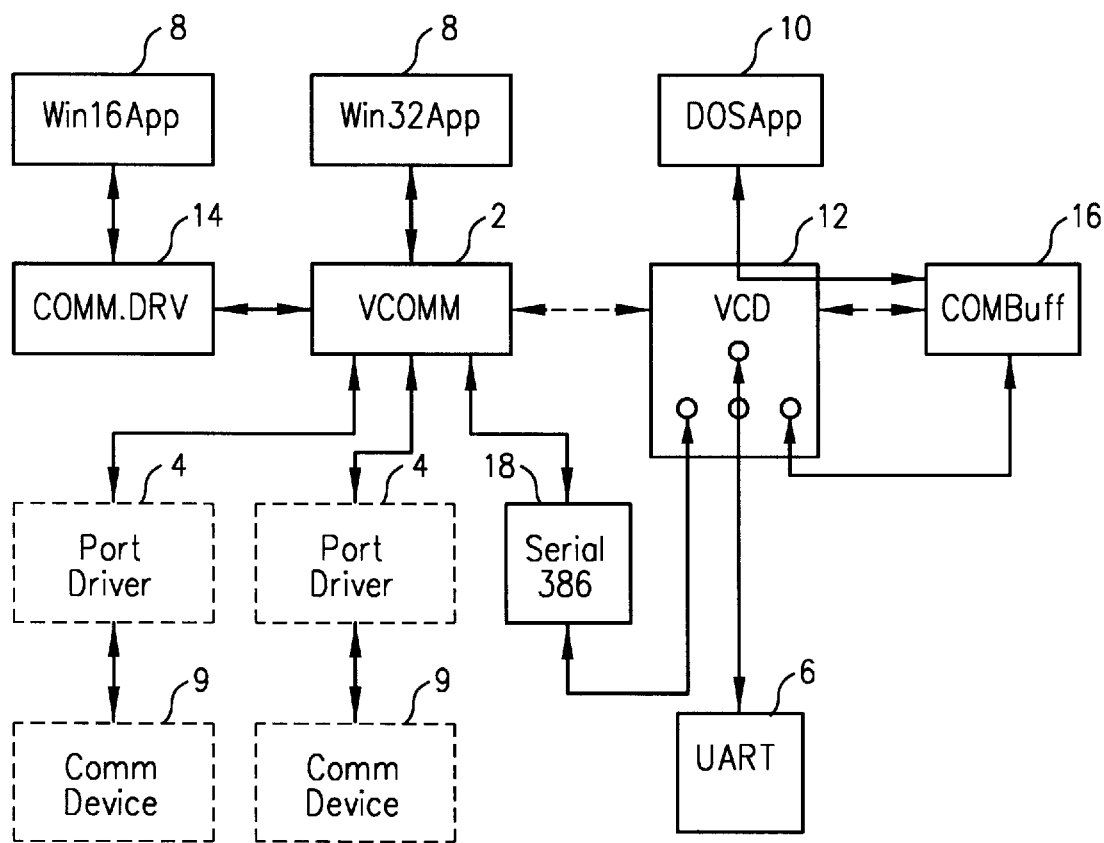
FIG. 2 is a depiction of the serial communication architecture under Windows™ 3.11 and Windows 95™.
Figure 3:
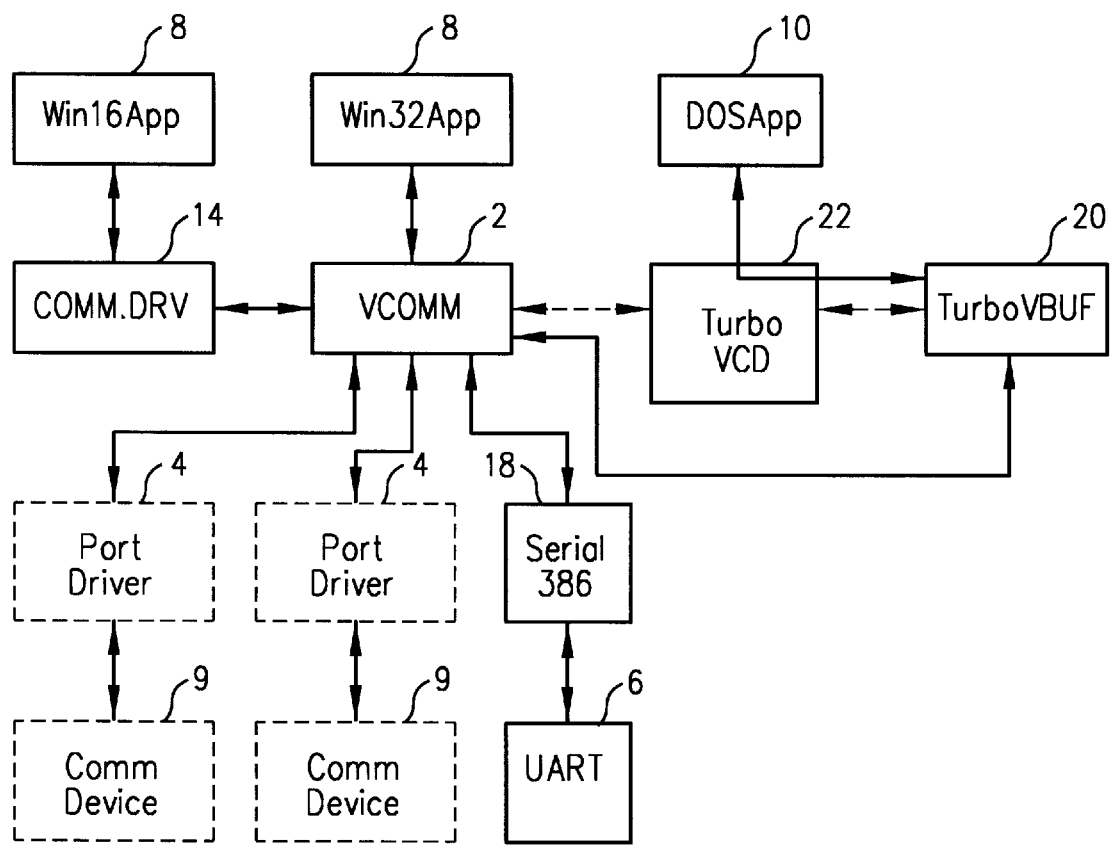
FIG. 3 is a depiction of the serial communication architecture under Windows™ 3.11 and Windows 95™ with the addition of the modules of the present invention.

The present invention provides a computer operating system method for allowing DOS based applications running under Windows for Workgroups™ or Windows 95™ operating system to access VCOMM 2 port drivers installed in the system. Referring to FIG. 3, UART I/O activity by the DOS application 10 is received by TurboVBUF. The interaction of TurboVBUF and TurboVCD 22 simulate a UART 6 and return to the DOS application simulations of the response of a UART 6. The UART 6 instructions are then translated into instructions for VCOMM 2. The translated instructions are then sent to VCOMM 2. VCOMM 2 responses are then received and translated into simulated UART 6 responses and transmitted to the DOS application 10.

The interaction of TurboVBUF and TurboVCD 22 creates a virtual UART. TurboVCD 22 does not depend on the detection of a real UART 6 to trigger creation of the data structures required to support contention handling and register trapping. For Windows™ 3.11, UART detection code in the VCD_Init_Port procedure is not executed if TurboVBUF is virtualizing the UART. There is no analogous code in Windows 95™. Instead, TurboVBUF calls into TurboVCD's VCD_Port_Arrival procedure to announce the presence of a port to be virtualized. If a UART is virtualized by TurboVBUF, TurboVCD 22 does not attempt to initialize a UART 6 associated with that port. This responsibility is handled by the UART 6 port driver 4 (e.g., SERIAL.386 18). TurboVCD 22 trapping routines are extended to UART register eight (the Scratch Register). The TurboVCD 22 VCD_CB_Struc structure provides Scratch Register data storage.

Implementation of TurboVCD

A bit in VCD_COM_Struc.VCD_Flags indicates that TurboVBUF is virtualizing a specific port. When this bit is set TRUE, TurboVCD 22 does not attempt physical access to the associated UART because the port may be only virtual and thus not be physically present. When this bit is set, TurboVCD 22 must fail calls to VCD__Set__Port__Global, VCD-Acquire__Port, VCD__Steal__Port__Windows__Style, VCD-PM-Acquire__Port, VCD__PM-Acquire-Port, and VCD__Attach, so as not to allow this port to be assigned Globally or used by older style COMM.DRV 14 modules from Windows™ 3.0 or 3.1.

Because TurboVCD 22 does not attempt physical accesses to a UART 6 associated with a port which has been virtualized by TurboVBUF, the initial values are predefined for the Virtual Divisor Latches, Virtual Line Control Register, Virtual Interrupt Enable Register, Virtual FIFO Control Register, Virtual MODEM Control Register, Virtual Line Status Register, and Virtual MODEM Status Register, rather than determined by reading them from an associated physical UART 6.

The Virtual Divisor Latches and Virtual Line Control Register are initialized to the same values used traditionally by the ROM BIOS to initialize a real UART 6: 2400 baud, 8 data bits, No Parity, and 1 Stop Bit. The Virtual Interrupt Enable Register is set to ZERO to indicate that all interrupts are OFF. The Virtual FIFO Control Register is set to ZERO to disable FIFO support. The Virtual MODEM Control Register is set to ZERO to indicate that out-going MODEM control lines are in the OFF state. The Virtual Line Status Register is set to 0C0h to indicate empty Transmitter Empty and Transmitter Holding Register Empty. The Virtual MODEM Status Register is initialized to ZERO, indicating that none of the MODEM control lines are asserted. The initial value for the Virtual Scratch Register is undefined. The contents of this register are only defined when an application writes to the register.

In order to achieve full emulation of a UART, TurboVCD 22 extends I/O register trapping to include the UART's Scratch Register. VCD__CB__Struc, a per-port VCD-defined structure, is enlarged to include an element which serves as the Virtual Scratch Register on a per-VM, per-port basis. I/O activity by an application is stored and retrieved in this memory location. Unlike other register traps, Scratch Register traps are not passed on to port virtualizers such as COMBuff 16 and TurboVBUF. Rather, they are handled entirely in TurboVCD 22. This is accomplished by testing for register usage in the VCD__Dispatch__IO procedure and using VCD's "TrapTable" for Scratch Register accesses.

Implementation of TurboVBUF

TurboVBUF can coexist with COMBuff 16. When more than one virtualizer is running at a time, such as TurboVBUF and COMBuff 16, each virtualizer makes its presence known to TurboVCD 22 so as to gain the status of "port virtualizer" for all the ports it has been designed to virtualize. As a result, TurboVBUF calls in to TurboVCD 22 first, to make itself the virtualizer for the ports the user has assigned to this virtualizer. This is accomplished by setting TurboVBUF's initialization order Declare__Virtual__Device,,,,,Init__Order to the appropriate value. For Windows™ 3.11, this value must be lower than the corresponding value for COMBuff 16. For Windows 95™, the initialization order is set to the same value as COMBuff 16, but TurboVBUF is loaded from the System Registry, whereas COMBuff 16 is loaded from the SYSTEM.INI file. For drivers of the same Init__Order, drivers listed in the System Registry are loaded before drivers listed in the SYSTEM.INI file.

During the Sys__Critical__Initialization (Windows™ 3.11) or Device__Init (Windows 95™) phase of TurboVBUF's initialization, TurboVBUF calls into TurboVCD's VCD__Virtualize__Port procedure to register itself as the module that will be handling virtualization for specific ports. To allow TurboVCD 22 to differentiate TurboVBUF from other port virtualizers (such as COMBuff 16) and to provide the special services listed in the TurboVCD 22 section above, TurboVBUF sets a specific bit in processor register ebx which TurboVCD 22 will recognize.

In order to provide an accurate simulation of a UART to an application, TurboVBUF provides a set of virtual UART registers in a data structure which TurboVBUF maintains on a per/port basis. UART Registers 0 through 6 are supported to the bit level. Where necessary, a separate virtual register is maintained for UART reads and writes.

TurboVBUF Initialization

TurboVCD 22 and TurboVBUF 20 both maintain private copies of the Virtual UART registers. When TurboVCD 22 is ready to hand off control of a port to TurboVBUF as the result of an application's access the I/O registers of a UART, TurboVCD 22 calls TurboVBUF's VBUF__VCD__Control procedure which attempts to open a VCOMM 2 communications channel and initialize the TurboVBUF Virtual UART registers. The Virtual Interrupt Enable Register is set to the current value of TurboVCD's Virtual Interrupt Enable Register. The Virtual Divisor Latches, SL and MS (which determine the baud rate), are set to the current value of TurboVCD's Virtual Divisor Latches. The Virtual FIFO Control Register is set to 0, turning the 16550 UART's FIFOs off. The Virtual Line Control Register is set to the current value of TurboVCD's Virtual Line Control Register. The Virtual MODEM Control Register is set to the current value of TurboVCD's Virtual MODEM Control Register. Then a call is made to __VCOMM__EscapeCommFunction to inform the port driver 4 of the current state of DTR and RTS. The Virtual Line Status Register is set to 0C0h (No Data Ready, Overrun Error, Parity Error, Framing Error, or Break Interrupt; Transmitter Holding Register Empty; and Transmitter Empty). The Virtual MODEM Status Register is set to the value returned by call to __VCOMM__GetModemStatus. The Interrupt State Table is initialized to 0 (no interrupts pending).

TurboVBUF Operation

The following is a list of virtual UART registers and their use in Normal Operating Mode (not Diagnostic Loop-back mode):

Reads only from Receive buffer (Reg 0)

Data is returned from the Virtual Receive Buffer Register. The Data Available Interrupt Bit in the Interrupt State Table and the Virtual Line Status Register are cleared.

Writes to Transmitter Holding Register (Reg 0)

Data is placed in the local transmit queue (TxFIFOqueue). If placing the data in the queue does not cause the queue to become full, and Transmitter Interrupt Bit in the Interrupt State Table is set. If the data causes the queue to become full, the Transmitter Interrupt Bit in the Interrupt State Table and the TxEmpty bit in the Virtual Line Status Register are cleared and the __VCOMM__WriteComm Procedure is called.

Reads from the Divisor Latch LS (Reg 0)

Data is returned from TurboVBUF's Virtual Divisor Latch LS data register.

Writes to Divisor Latch LS (Reg 0)

Divisor Latch LS data is placed in TurboVBUF's Virtual Divisor Latch LS data register. The actual baud rate is calculated based on content of the MS and LS Virtual Divisor Latch registers and placed in the DeviceControl-Block (DCB) structure. __VCOMM__SetCommState is called to inform the port driver 4 of a change in baud rate if the Divisor Latch data has changed from the previous value.

Writes to the Interrupt Enable Register (Reg 1)

Data is stored in the Virtual Interrupt Enable Register.

Reads from the Interrupt Enable Register (Reg 1)
   Data is returned from the Virtual Interrupt Enable Register.

Reads from the Divisor Latch MS (Reg 1)
   Data is returned from TurboVBUF's Virtual Divisor Latch MS data register.

Writes to the Divisor Latch MS (Reg 1)
   Divisor Latch MS data is placed in TurboVBUF's Virtual Divisor Latch MS data register. The actual baud rate is calculated based on content of the MS and LS Virtual Divisor Latch registers and placed in the DeviceControl-Block (DCB) structure and __VCOMM__SetCommState is called to inform the port driver 4 of a change in baud rate if the Divisor Latch data has changed from the previous value.

Writes to the FIFO Control Register (Reg 2)
   Writes to enable FIFOs are stored in the Virtual FIFO Control Register. Writes to disable FIFOs, in addition, clear the Data Ready Bit in the Virtual Line Status Register and any received data.

Reads from the Interrupt Identification Register (Reg 2)
   Data is returned that is appropriate to the current state of the UART's Interrupt Enable Register and Virtual Interrupt State Table, using the same interrupt priorities as an 8250 UART. In order to accumulate the responses of a 16550 UART the value 0xC0 will be ANDed if bit zero in the Virtual FIFO Control Register is True.

Writes to the Line Control Register (Reg 3)
   No action occurs if there is no change from the current value in the Virtual Line Control Register. If a change has occurred, the new value replaces the old value in the Virtual Control Register. The new value is then parsed and placed in the DCB, followed by a call to __VCOMM__SetCommState to inform the port driver 4 of the changes in the Line Control parameters.

Reads from the Line Control Register (Reg 3)
   Data is returned from the Virtual Line Control Register.

Writes to the MODEM Control Register (Reg 4)
   No action occurs if there is no change from the current value in the Virtual MODEM Control Register. If DTR and/or RTS has changed, __VCOMM__EscapeCommFunction is called with the appropriate arguments to inform the port driver 4. IF OUT2 has changed and is now clear, interrupts simumulation to the VM is resumed. If OUT2 is now set, interrupts to the VM are simulated.

Reads from the MODEM Control Register (Reg 4)
   Data is returned from the virtual MODEM Control Register.

Writes to the Line Status Register (Reg 5)
   Writes to the Line Status Register are ignored.

Reads from the Line Status Register (Reg 5)
   Data is returned from the Virtual Line Status Register and the Line Status Interrupt Bit in the Interrupt State Table is cleared.

Writes to the MODEM Status Register (Reg 6)
   The low order nibble of the write replaces the low order nibble stored in the Virtual MSR Delta Register.

Reads from the MODEM Status Register (Reg 6)
   __VCOMM__GetModemStatus is called to get the current state of CTS, DSR, RI and DCD. This value, OR'd with the contents of the Virtual MSR Delta Register is returned. The MODEM Status Interrupt Bit in the Interrupt State Table and the Virtual MSR Delta Register are cleared.

When the UART's MODEM Control Register is set, enabling the UART's Diagnostic Loop-back mode, reads and writes to UART registers are affected as follows:

Writes to Transmitter Holding Register (Reg 0)
   Data is transferred directly to the Virtual Receive Buffer Register and is not sent to the VCOMM 2 port driver 4.

Writes to the MODEM Control Register (Reg 4)
   If the virtual UART is not already in Loop-back mode, then:
   1) __VCOMM__EscapeCommFunction calls are made to clear DTR and RTS.
   2) the Data Available bit in the Virtual Line Status Register is cleared.
   3) the lower nibble bits of the write is mapped into the appropriate upper nibble bits of the Virtual MODEM Status Register.
   4) a new value for MODEM Status Register delta bits is computed to flag changes in the upper nibble bits. The value is stored in the Virtual MODEM Status Register. If the Virtual UART is already in Loop-back mode, then only steps three and four are performed.

Reads from the MODEM Status Register (Reg 6)
   The contents of the Virtual Modem Status Register are returned without calling the VCOMM 2 port driver 4 for an update.

During UART I/O operations, the Interrupt State Table is affected as follows:
   Reads to Virtual Receiver Buffer Register: clears Data Available Interrupt Bit.
   Writes to the Virtual Transmitter Holding Register which fills the local Tx FIFO and times out of the timer associated with the Tx FIFO: clears Tx Empty Interrupt Bit.
   Reads of the Virtual MODEM Status Register: clears Modem Status Interrupt Bit.
   Reads of the Virtual Line Status Register: clears Line Status Interrupt Bit.

The Interrupt State Table is also affected by VCOMM 2 Callbacks to the VBUF__CommNotifyProc procedure which notify TurboVBUF of:
   Reception of data: sets the Data Available Interrupt Bit and causes a call to __VCOMM__ReadComm to collect received data.
   Empty transmit buffers: sets the Tx Empty Interrupt Bit.
   Changes in the state of CTS, DSR, RI, and DCD: sets the Modem Status Interrupt Bit and sets appropriate bits in the Virtual Line Status Register.
   Detection of parity, overrun, framing, or break error: sets the Line Status Interrupt Bit and sets appropriate bits in the Virtual Line Status Register.

To reduce the number of times that TurboVBUF must call port drivers by way of the __VCOMM__WriteComm procedure with characters to be transmitted, a FIFO queue (TxFIFOqueue) absorbs characters written by an application to TurboVBUF's Virtual UART Transmitter Holding Register until the queue is full. When the queue becomes full, __VCOMM__WriteComm is called and all characters in the queue are delivered to the VCOMM 2 port driver 4. A software timer is associated with each TxFIFO queue. Each time a character is written to the queue or the queue is emptied to a VCOMM 2 port driver 4, the timer is reset to zero. If the timer times-out and there are characters in the queue, the queue is written to the VCOMM 2 port driver 4. This mechanism prevents data from remaining for protracted periods in a partially full TxFIFO queue.

The TXFIFO queue is created during TurboVBUF initialization. A queue with a default length of 16 bytes is created for each port that TurboVBUF supports. The length can be amended by a string in the SYSTEM.INI file for Windows™ 3.11 or a registry entry for Windows 95™.

From the foregoing teachings, it can be appreciated by one skilled in the art that a new, novel, and nonobvious method for allowing DOS based applications running under Windows for Workgroups™ or Windows 95™ operating systems to access VCOMM port drivers installed in the system. It is to be understood that numerous alternatives and equivalents will be apparent to those of ordinary skill in the art, given the teachings herein, such that the present invention is not to be limited by the foregoing description but only by the appended claims.

We claim:

1. A computer operating system method for allowing applications running in Virtual Machines making direct UART I/O accesses under Windows for Workgroups™ or Windows 95™ operating systems to access VCOMM port drivers installed in the system comprising the steps of:

a) receiving from the application instructions for a UART;
   b) simulating a UART by returning to the application simulations of the responses of a UART;
   c) translating the instructions for a UART into instructions for VCOMM;
   d) sending the translated instructions to VCOMM;
   e) receiving responses from VCOMM;
   f) translating the responses from VCOMM into simulated responses from a UART; and
   g) transmitting the simulated responses from a UART to the application.

2. The method described in claim 1, further including the sub-step of simulating all 8 UART registers by creating in a memory 8 fields for receiving and storing instructions from an application running in a Virtual Machine making direct UART I/O accesses wherein each field corresponds to one of the 8 registers in a UART.

3. The method described in claim 1, further comprising the step of:

h) managing contentions between UART based devices.

4. The method described in claim 2, wherein the sub-step of simulating UART registers includes simulating the FIFO buffers of the 16550 UART and the UART Scratch register.

5. The method described in claim 1, wherein the step of simulating a UART includes simulating a UART's diagnostic test mode.

6. A method for improving performance in a computer operating system implementing a virtual UART to communicate with a VCOMM port driver running under Windows for Workgroups™ or Windows 95™ operating systems comprising the steps of:

a) accumulating characters written to the virtual UART in a holding register;
   b) calling the VCOMM_WriteComm Procedure when said holding register is full; and
   c) transmitting said accumulated characters to the VCOMM port driver.

7. The method of claim 6, wherein, to prevent data from remaining in a partially full holding register for a protracted length of time, said step of accumulating characters is limited to a predetermined length of time and, if such length of time is reached before said holding register is full, the VCOMM_WriteComm Procedure is called and said accumulated characters are delivered to the VCOMM port driver.

* * * * *